United States Patent [19]
Eckert

[11] Patent Number: 5,201,269
[45] Date of Patent: Apr. 13, 1993

[54] ROLLER CHAIN FOR PAPER INFEED DEVICE

[75] Inventor: Günther O. Eckert, Würzburg, Fed. Rep. of Germany

[73] Assignee: Koenig & Bauer Aktiengesellschaft, Wurzburg, Fed. Rep. of Germany

[21] Appl. No.: 859,849

[22] Filed: Mar. 30, 1992

[30] Foreign Application Priority Data

Apr. 3, 1991 [DE] Fed. Rep. of Germany ....... 4110668

[51] Int. Cl.$^5$ .............................................. B41F 13/54
[52] U.S. Cl. .................................... 101/228; 226/92; 59/4; 59/95; 474/210
[58] Field of Search .............. 101/181, 219, 225, 228, 101/231; 226/91, 92; 59/4, 5, 6, 78, 84, 87, 88, 95; 474/209, 210

[56] References Cited

U.S. PATENT DOCUMENTS

| | | | |
|---|---|---|---|
| 2,455,624 | 12/1948 | Tenetz | 474/210 |
| 4,404,907 | 9/1983 | Kobler et al. | 101/228 |
| 4,499,781 | 2/1985 | Lew | 74/190 |
| 4,598,850 | 7/1986 | Winterholler et al. | 101/228 |
| 4,819,557 | 4/1989 | Handschuber | 101/228 |

FOREIGN PATENT DOCUMENTS

| | | | |
|---|---|---|---|
| 2832751 | 2/1980 | Fed. Rep. of Germany | 474/210 |
| 3048797 | 12/1980 | Fed. Rep. of Germany | |

*Primary Examiner*—Edgar S. Burr
*Assistant Examiner*—Ren Yan
*Attorney, Agent, or Firm*—Jones, Tullar & Cooper

[57] ABSTRACT

A roller chain for a paper infeed device of a web-fed rotary printing machine utilizes a plurality of fork shaped butt straps which are arranged in sequential inverted order. Fork ends of adjacent butt straps are carried by a roller axle bolt. Base portions of adjacent butt straps are connected by a hinge pin.

9 Claims, 4 Drawing Sheets

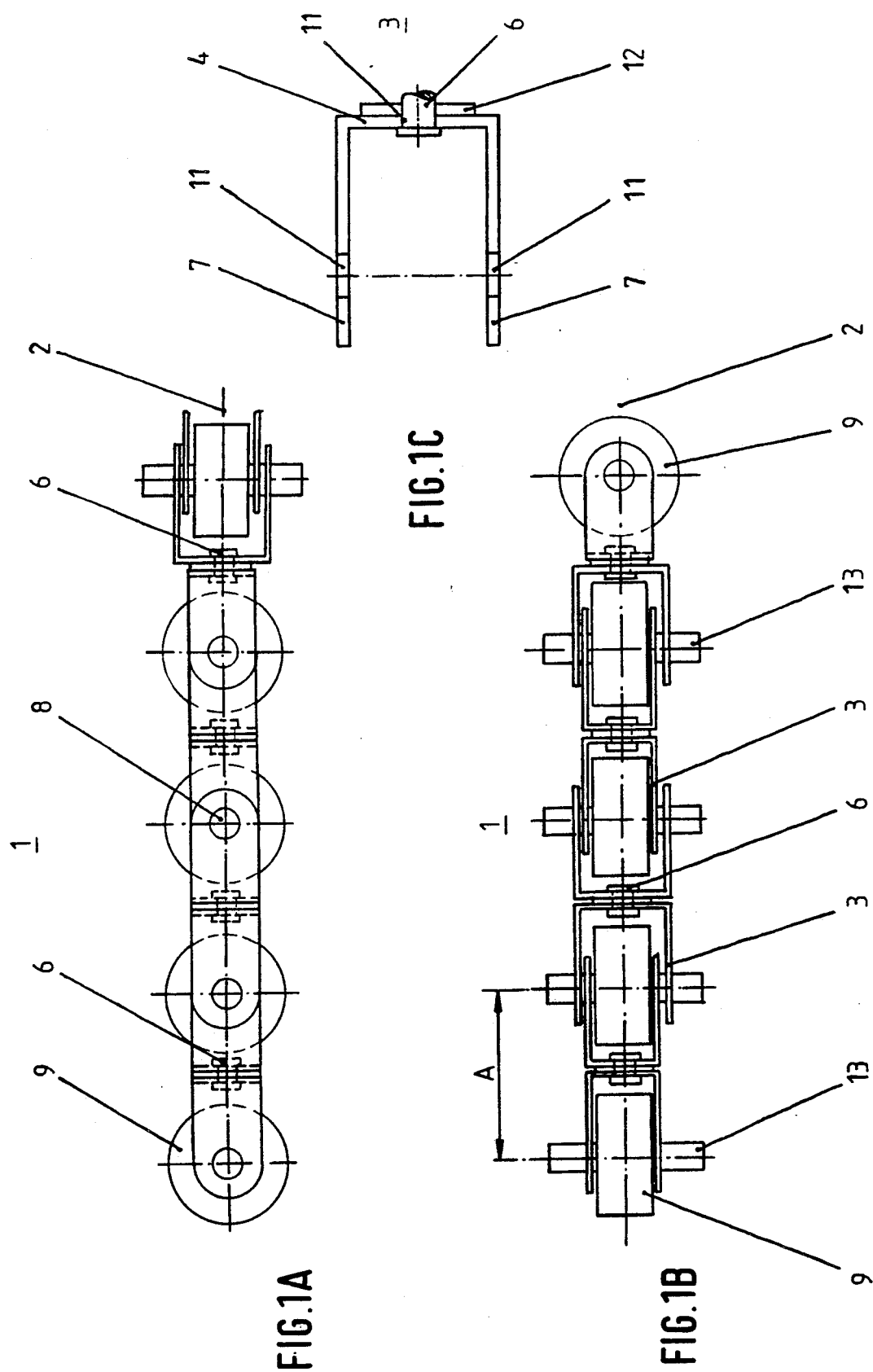

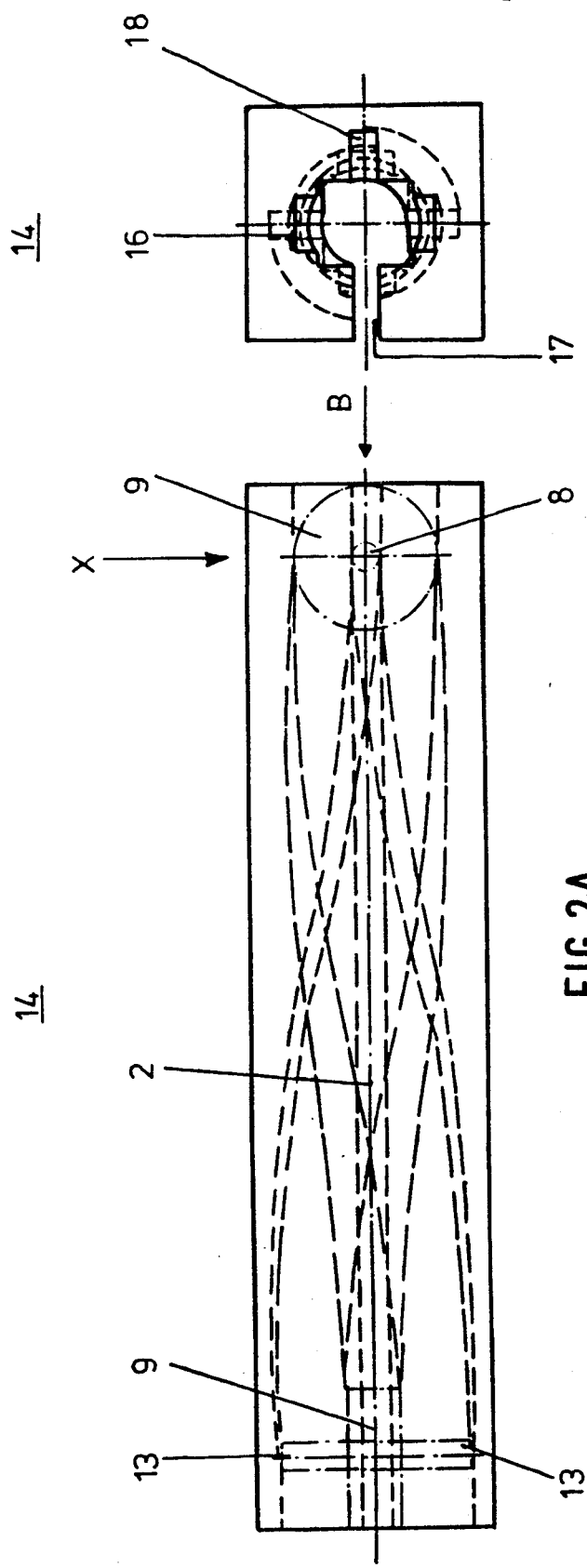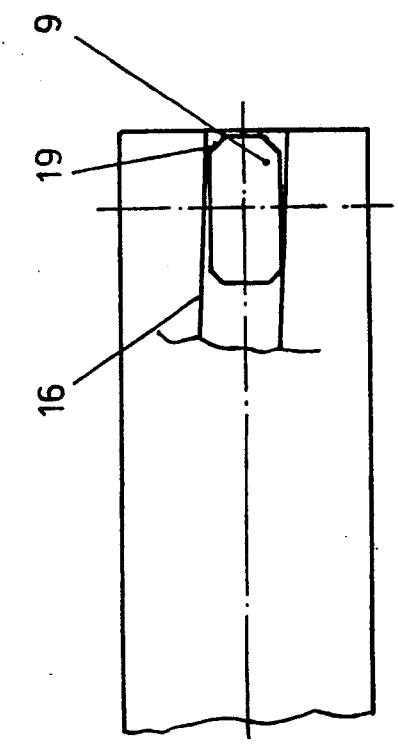

ROLLER CHAIN FOR PAPER INFEED DEVICE

FIELD OF THE INVENTION

The present invention is directed generally to a roller chain for a paper infeed device. More particularly, the present invention is directed to a roller chain for a paper web infeed device. Most specifically, the present invention is directed to a roller chain for a paper infeed device for a web-fed rotary printing press. The roller chain utilizes a plurality of generally fork shaped butt straps that each supports an individual roller between spaced arms of the fork. Alternating butt straps are positioned in an inverted arrangement so that fork portions of adjacent straps are carried on the same roller axle bolt while base portions of adjacent butt straps are joined by a hinge pin or bolt. The roller chain runs in cooperatively shaped chain guides and carries suitable paper web clamping devices.

DESCRIPTION OF THE PRIOR ART

It is generally known in the art to provide paper infeed devices in web-fed rotary presses. These paper infeed devices are typically utilized to feed the paper web into the printing machine before the start of the production operation. These paper-infeed devices are also used to re-start the infeed of the paper web if a web break occurs during the printing operation. Thus these generally known paper infeed devices provide a way of feeding the leading end of a paper web into the rotary printing press.

One generally known type of paper infeed device utilizes a roller chain assembly which is guided in suitable plastic guide paths and is drawn by motors. These drive motors are spaced from each other at a spacing which must be less than the length of the roller chain. This roller chain assembly carries at least one paper web clamping piece or assembly which is used to engage the leading end of the paper web that is to be fed to the printing machinery. These prior roller chains are suitable for running any kind of path, such as, for example on the inside of a frame of a rotary press, which means on one level. During this running of these chains, the chains are not only under tension but are also under pressure. The paper web tension acts, from the leading edge of the roller chain to the driving pinion as an impression force.

When the paper web is to be fed in or threaded in over angle bars and the like towards formers, the paper web infeed device must be able to leave the level of the inside of the frame. In the prior art, this has been accomplished, as shown in the German patent specification No. 30 48 797, by using a warping roller chain. This prior chain has been utilized particularly for threading in material webs into web-fed rotary presses and discloses the use of a roller chain assembly in which generally known butt strap pairs are alternatingly combined with elastic wire-shaped stick pairs.

A limitation of this prior art warping roller chain is that the distance of the rolls with respect to each other varies, particularly in the case of a three dimensional curved course and an inclination of the stick pairs. This results in a clamping power over the roller onto the running path of the rolls, as the direction of force of the rolls is not identical with the direction of the force transmission means.

In the German published unexamined patent application No. 3 725 634 there is shown a warping roller chain for a paper infeed device in a printing machine. This prior roller chain replaces the generally known stiff butt strap pairs with flexible ropes. These flexible ropes are surrounded by less flexible spacer elements. This prior art roller chain has a limitation similar to that discussed in connection with the device shown in the previously mentioned German patent specification No. 30 48 797. The spacer elements which are carried by the flexible ropes distort when the roller chain is fed along a three dimensional path or course so that the roller chain does not run parallel to the device providing the propulsive power. This results in a torsional moment which may cause the rollers to jam in their running path.

It will be seen that a need exists for a roller chain in a paper web infeed device that is flexible and that can run along a curving or twisting path. The roller chain for a paper infeed device in accordance with the present invention provides such a device and is a significant improvement over the prior art devices.

SUMMARY OF THE INVENTION

It is an object of the present invention to provide a roller chain for a paper infeed device.

Another object of the invention is to provide a roller chain for a paper web infeed device.

A further object of the invention is to provide a roller chain for a paper infeed device of a web-fed rotary printing press.

Still another object of the invention is to provide a roller chain for a paper infeed device that has three dimensional flexibility.

Yet a further object of the present invention is to provide a roller chain for a paper web infeed device that is able to handle tension and impression forces.

Even still another object of the present invention is to provide a roller chain for a paper web infeed device which is technically uncomplicated and which avoids any jamming effect.

As will be discussed in detail in the description of the preferred embodiment which is set forth subsequently, the roller chain for a paper infeed device in accordance with the present invention utilizes a plurality of rollers which are connected in a serial manner by fork-shaped butt straps to form a chain. The butt straps are arranged in a repeating inverted arrangement such that the fork ends of adjacent butt shapes are carried on the same roller's axle bolt. The bases of adjacent butt straps are connected by a hinge pin and an interposed washer. The resulting roller chain is flexible and can move freely.

The roller chain in accordance with the present invention provides a warping or twisting roller chain for a paper web infeed device of a web-fed rotary printing press which will allow tension forces, and particularly impression forces to be controlled. The butt straps, which are connected to each other by hinge pins directly transmit the impression forces that occur over the rollers and onto the chain guides. The side forces and accompanying jamming effects of the prior art devices are thus avoided by the present roller chain.

The chain links of the roller chain in accordance with the present invention are easily and inexpensively manufactured. Only metal stamped parts and bolts are required to form the assembly.

The roller chain for a paper infeed device in accordance with the present invention overcomes the limitations of the prior art devices. It represents a substantial advance in the art.

BRIEF DESCRIPTION OF THE DRAWINGS

While the novel features of the roller chain for a paper infeed device in accordance with the present invention are set forth with particularity in the appended claims, a full and complete understanding of the invention may be had by referring to the detailed description of the preferred embodiment which is presented subsequently, and as illustrated in the accompanying drawings, in which:

FIG. 1A is a side elevation view of a roller chain in accordance with the present invention with one link of the chain rotated 90°;

FIG. 1B is a top plan view of the roller chain of FIG. 1A;

FIG. 1C is a top plan view of a fork-shaped butt strap usable in the roller chain of the present invention;

FIG. 2A is a side elevation view of a chain guide cam piece usable with the roller chain of the present invention;

FIG. 2B is an end view of the chain cam guide piece taken in the direction indicated by B in FIG. 2A;

FIG. 2C is a top plan view of the chain guide cam piece of FIG. 2A, taken in the direction indicated by X;

DESCRIPTION OF THE PREFERRED EMBODIMENT

Figure 3B:
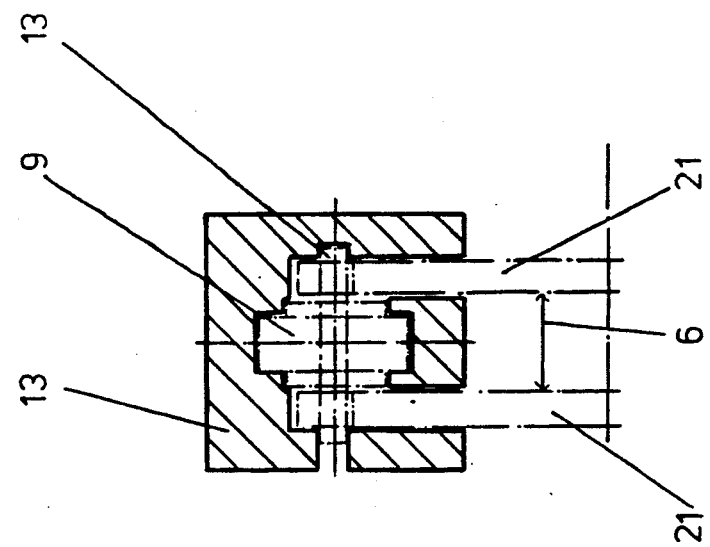
FIG. 3B is a cross-sectional view of the chain guide straight piece, taken along line B—B of FIG. 3A.

Referring initially to FIGS. 1A, 1B, and 1C, there may be seen, generally at 1 a preferred embodiment of a roller chain for a paper infeed device in accordance with the present invention. As may be seen more clearly in FIG. 1B, each chain link A of the roller chain 1 is assembled utilizing a pair of generally fork shaped butt straps 3, one of which is shown most clearly in FIG. 1C. The resulting roller chain 1 has a longitudinal chain axis 2.

Each butt strap 3 is generally fork or U-shaped and has a strap base 4 with two generally parallel spaced fork arms that terminate in fork ends 7. The fork ends 7 each have an axle receiving aperture 11 with the apertures 11 in the two fork ends 7 of each butt strap 3 being aligned with each other.

A roll or roller 9 is supported between the two spaced, parallel fork arms of each butt strap 3. A roller axle bolt 8 passes through the center of the roller 9 and is supported in the fork arm apertures 11. End portions 13 of each axle bolt 8 extend beyond the outer surfaces of the fork arms, as seen in FIG. 1B. While not specifically shown, it will be understood that suitable clips or fasteners will be used to secure the roller 9 to the axle bolt 8; and the axle bolt 8 in the fork arms.

As may be seen most clearly in FIG. 1B, the roller chain 1 is formed by placing alternating ones of the butt straps 3 in inverted or mirror image orientation. This means that base surfaces 4 of serially arranged butt straps 3 are adjacent each other, and that fork ends 7 of serially arranged butt straps 3 are carried by the same axle bolt 8. A hinge pin 6, which lies on the longitudinal axis 2 of the roller chain 1, is used to connect the base portions 4 of adjacent butt straps 3. The hinge pin 6 passes through aligned holes 11 in the center of each base 4 of each butt strap 3. The hinge pin 6 may be a rivet or a headed over or upset bolt or the like. A washer 12 is interposed between the adjacent base surfaces 4 of butt straps 3 that are connected by a hinge pin 6. This washer 12 will diminish or reduce the friction between the two base surfaces 4 as the parts A of the roller chain 1 are rotated. Such a relative rotation between two of the chain links A is depicted at the right end of the roller chain shown in FIGS. 1A and 1B. While this rotation is depicted as 90°, it will be appreciated that the roller chain 1 is shiftable through any desired angle, as is required when the roller chain assembly 1 is required to pass through a chain guide that has a three dimensional structure.

Turning now to FIGS. 2A, 2B and 2C, there may be seen a cam piece for a plastic chain guarding assembly, generally at 14. The various links A of the roller chain 1 of the present invention are guided by the chain guide 14 and are caused to twist and turn and to be warped in three dimensions. As may be seen in FIG. 2B, the chain guide cam piece 14 is generally C-shaped in cross-section. The rollers 9 of the chain 1 ride along a chain running path 16. First ends 13 of the roller axle bolts 8 which support the individual rollers 9 pass through an opening or slot 17 on one side of the chain cam guide piece 14. Second, opposite ends 13 of the roller axle bolts 8 are received in a groove-shaped pocket slot 18 which is facing the opening 17. This pocket slot 18 is formed in the back wall of the chain guide 14.

The individual rollers 9 that form the roller chain 1 have chamfered edges, generally at 19, as may be seen in FIG. 2C. This chamfering of the roller edges helps to reduce frictional drag as the roller chain 1 moves along through the chain guide pieces, such as the chain guide cam piece shown at 14 in FIG. 2A. The twisting of the roller chain 1 as it moves along the running path 16 in the cam piece 14 results in contact between the roller 9 and the inner walls of the guide piece 14. The chamfered edges 19 of the roller 9 diminishes the frictional losses occasioned by this contact.

Figure 3A:
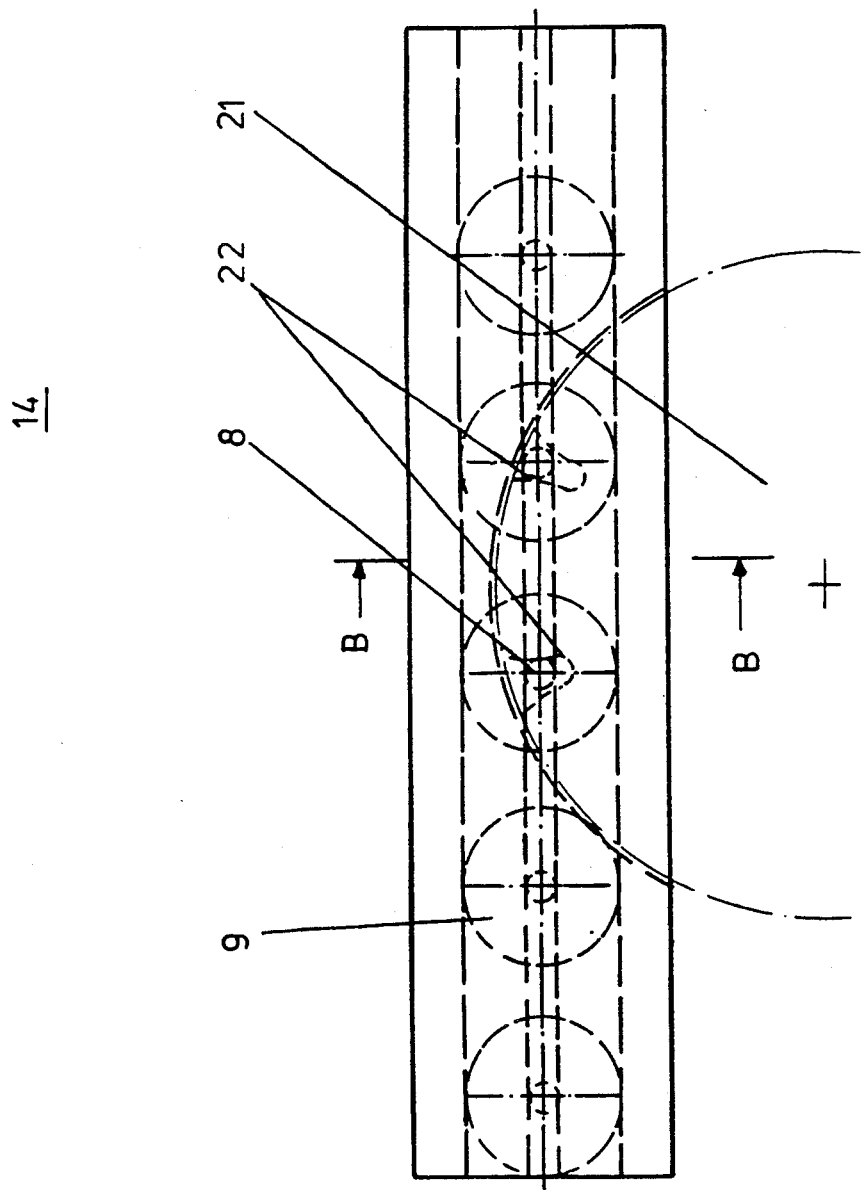
FIG. 3A is a side elevation view of a chain guide straight piece for guiding the roller chain of the present invention and showing a roller chain drive wheel.

A chain guide straight piece or section is shown at 14 in FIGS. 3A and 3B. The roller chain 1 is driven by a driving wheel 21 that has a pair of spaced sprocket wheels. These two wheels, as may be seen in FIG. 3B, are spaced from each other by a spacing b. The spacing is selected so that tooth flanks 22 of the sprocket wheels 21 engage the ends 13 of the roller axle bolts 8 exteriorly of the butt strap fork ends 7 yet interiorly of the side walls of the chain guide straight piece 14. It will be seen that the sprocket wheels 21 pass up through openings in the bottom portion of the chain guide straight pieces 14. These driving wheels 21 are in connection with suitable drive means (not shown) from the web-fed rotary printing press and are located in the press at certain distances from each other. These spacings between sequentially arranged drive wheels 21 will be understood as being less than the length of the roller chain 1 so that the roller chain 1 will extend between and beyond the drive wheels 21.

Figure 4A:
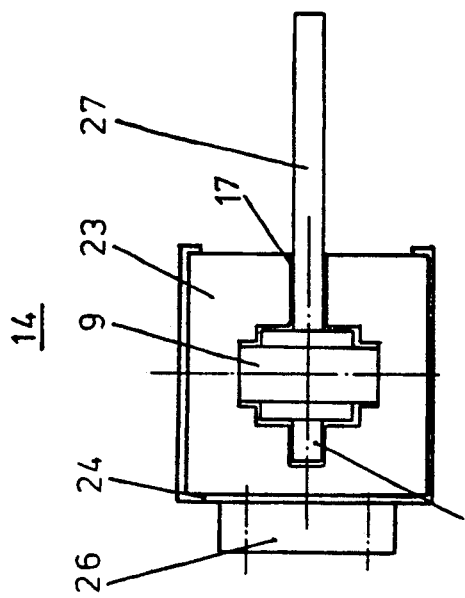
FIG. 4A is a side elevation view of a chain guide straight piece and showing a paper web attachment bolt.
Figure 4B:
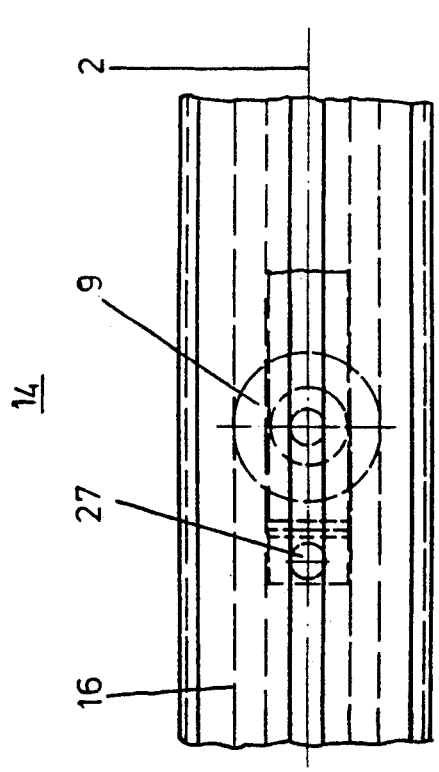
FIG. 4B is an end view of the chain guide straight piece of FIG. 4A.
Figure 4C:
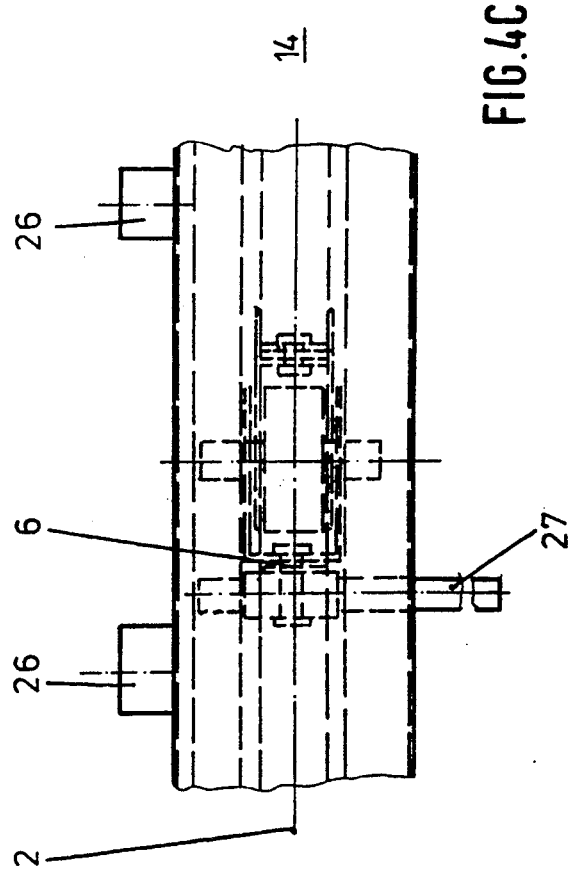
FIG. 4C is a top view of the chain guide straight piece of FIG. 4A.

In FIGS. 4A, 4B and 4C there may be seen a separate depiction of a chain guide straight section 14. The chain guide 14 can consist of a plastic body 23 which, as discussed previously, has a generally C-shaped cross section, as seen in FIG. 4B. A sheet metal cage or frame, generally at 24 may surround the plastic body 23 and is provided with suitable, spaced attachment points or devices 26 so that the chain guide 14 can be secured to the printing machine. At the leading edge of the roller chain 1 there is provided a paper web attachment (not shown) which is secured to a bolt 27 that is attached to the base 4 of the leading butt strap 3 by use of a hinge bolt 6, as is shown in FIG. 4C. This bolt 27 projects through the slot 17 in the chain guide piece 14. The paper web attachment that is held by bolt 27 is used to grasp the leading edge of the paper web and to thus allow the roller chain to feed the paper web through to the start of the rotary printing machine.

While a preferred embodiment of a roller chain for a paper infeed device in accordance with the present invention has been set forth fully and completely hereinabove, it will be apparent to one of skill in the art that a number of charges in, for example the overall length of the roller chain, the sizes of the rollers, the use of various bearings and the like could be made without departing from the true spirit and scope of the invention which is accordingly to be limited only by the following claims.

What is claimed is:

1. A roller chain for a paper infeed device of a web fed rotary printing press, said roller chain comprising:
   a plurality of generally fork shaped butt straps, each said butt strap having a base portion and a pair of spaced fork arms, each said fork arm having an aperture, said plurality of butt straps being positioned in an elongated, repeating inverted arrangement along a longitudinal chain axis of said roller chain with the fork arms of adjacent oppositely facing butt straps overlapping to align their apertures;
   a plurality of rollers, each said roller having a roller axle bolt, said roller axle bolt for each said roller extending through said aligned ones of said fork arm apertures of two adjacent ones of said butt straps; and
   a plurality of hinge pins, each one of said hinge pins connecting said base portions of adjacent ones of said butt straps, each of said hinge pins having a longitudinal pin axis which is aligned with said longitudinal chain axis of said roller chain.

2. The roller chain of claim 1 wherein said base portion of each said butt strap has a central aperture which receives said hinge pin.

3. The roller chain of claim 1 wherein said hinge pin is an upset bolt.

4. The roller chain of claim 1 wherein said hinge pin is a rivet.

5. The roller chain of claim 1 further including a washer interposed between said adjacent base portions and usable to reduce friction between said adjacent base portions.

6. The roller chain of claim 1 wherein said fork arm apertures are generally perpendicular to said longitudinal chain axis of said roller chain.

7. The roller chain of claim 1 wherein said roller axle bolt for each said roller has elongated ends, said ends being engagable with tooth flanks of roller chain drive wheels.

8. The roller chain of claim 1 wherein each said roller has an outer peripheral running surface and further wherein edge portions of said running surfaces are chamfered.

9. The roller chain of claim 1 further including a paper web clamping mechanism attaching bolt secured to at least one of said hinge pins.

* * * * *